(12) United States Patent
Selvaganapathy et al.

(10) Patent No.: US 12,028,909 B2
(45) Date of Patent: Jul. 2, 2024

(54) COMMUNICATING BETWEEN A TERMINAL AND A WIRELESS NETWORK NODE

(71) Applicant: Nokia Technologies Oy, Espoo (FI)

(72) Inventors: Srinivasan Selvaganapathy, Bangalore (IN); Haitao Li, Beijing (CN)

(73) Assignee: NOKIA TECHNOLOGIES OY, Espoo (FI)

(*) Notice: Subject to any disclaimer, the term of this patent is extended or adjusted under 35 U.S.C. 154(b) by 476 days.

(21) Appl. No.: 17/299,737

(22) PCT Filed: Jan. 4, 2019

(86) PCT No.: PCT/CN2019/070337
§ 371 (c)(1),
(2) Date: Jun. 3, 2021

(87) PCT Pub. No.: WO2020/140248
PCT Pub. Date: Jul. 9, 2020

(65) Prior Publication Data
US 2022/0022265 A1    Jan. 20, 2022

(51) Int. Cl.
*H04W 74/08* (2024.01)
*H04L 1/1867* (2023.01)
*H04W 72/23* (2023.01)
*H04W 74/00* (2009.01)
*H04W 74/0833* (2024.01)

(52) U.S. Cl.
CPC ....... *H04W 74/0841* (2013.01); *H04L 1/1896* (2013.01); *H04W 72/23* (2023.01); *H04W 74/006* (2013.01)

(58) Field of Classification Search
None
See application file for complete search history.

(56) References Cited

U.S. PATENT DOCUMENTS

| 10,506,605 | B2* | 12/2019 | Lee | H04W 72/51 |
| 2015/0003355 | A1 | 1/2015 | Dalsgaard et al. | |
| 2018/0270892 | A1* | 9/2018 | Choi | H04W 36/34 |
| 2019/0281641 | A1* | 9/2019 | Cheng | H04L 41/08 |
| 2019/0306873 | A1* | 10/2019 | Lin | H04W 72/1268 |
| 2020/0028652 | A1* | 1/2020 | Bai | H04W 72/21 |

(Continued)

FOREIGN PATENT DOCUMENTS

| CN | 104919883 A | 9/2015 |
| CN | 106416392 A | 2/2017 |

(Continued)

OTHER PUBLICATIONS

Extended European Search Report received for corresponding European Patent Application No. 19906648.1, dated May 24, 2022, 8 pages.

(Continued)

*Primary Examiner* — Eunsook Choi
(74) *Attorney, Agent, or Firm* — SQUIRE PATTON BOGGS (US) LLP (57) ABSTRACT

A method of communicating between a terminal and a wireless network node comprising, at the terminal: checking validity of a timing advance; and if the timing advance is valid, causing sending of an uplink connection request within a preconfigured uplink resource.

20 Claims, 4 Drawing Sheets

(56) References Cited

U.S. PATENT DOCUMENTS

| | | | |
|---|---|---|---|
| 2020/0068619 A1* | 2/2020 | Kim | H04W 74/0833 |
| 2020/0260495 A1* | 8/2020 | Kim | H04W 74/006 |
| 2021/0112590 A1* | 4/2021 | Kim | H04W 74/008 |
| 2021/0112598 A1* | 4/2021 | Ryu | H04W 76/10 |

FOREIGN PATENT DOCUMENTS

| | | |
|---|---|---|
| WO | 2014/059671 A1 | 4/2014 |
| WO | 2017/148403 A1 | 9/2017 |
| WO | 2018/034602 A1 | 2/2018 |

OTHER PUBLICATIONS

"Considerations for Preconfigured UL Resources in A-MTC", 3GPP TSG RAN WG1 Meeting #94bis, R1-1810649, Agenda : 6.2.1.2, Sony, Oct. 8-12, 2018, 5 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300, V15.3.0, Sep. 2018, pp. 1-358.

International Search Report and Written Opinion received for corresponding Patent Cooperation Treaty Application No. PCT/CN2019/070337, dated Sep. 27, 2019, 9 pages.

"Transmission in Preconfigured Uplink Resources", 3GPP TSG-RAN WG2 #103bis, R2-1814342, Agenda : 12.2.4, Ericsson, Oct. 8-12, 2018, 9 pages.

"Signaling Aspects for Transmission in Preconfigured Resources", 3GPP TSG RAN WG2 Meeting #104, R2-1817043, Agenda : 12.2.4, Nokia, Nov. 12-16, 2018, 5 pages.

"Support for Transmission in Preconfigured UL Resources in LTE-MTC", 3GPP TSG-RAN WG1 Meeting #94bis, R1-1810186, Agenda : 6.2.1.2, Ericsson, Oct. 8-12, 2018, pp. 1-8.

Office Action received for corresponding Indian Patent Application No. 202147032119, dated Mar. 3, 2022, 8 pages.

Office action received for corresponding Chinese Patent Application No. 201980085511.9, dated Aug. 12, 2023, 8 pages of office action and no page of translation available.

"Use cases for transmission in preconfigured uplink resources", 3GPP TSG-RAN WG2 #103bis, R2-1814343, Agenda: 12.2.4, Ericsson, Oct. 8-12, 2018, 5 pages.

"Analysis for transmission over preconfigured shared resources in IDLE", 3GPP TSG-RAN2 meeting#104, R2-1817053, Agenda: 12.2.4, ZTE Corporation, Nov. 12-16, 2018, 7 pages.

Chinese Office Action issued in corresponding Chinese Patent Application No. 201980085511.9 on Feb. 27, 2024.

* cited by examiner

COMMUNICATING BETWEEN A TERMINAL AND A WIRELESS NETWORK NODE

RELATED APPLICATION

This application was originally filed as PCT Application No. PCT/CN2019/070337 on Jan. 4, 2019, each of which is incorporated herein by reference in its entirety.

TECHNOLOGICAL FIELD

Embodiments of the present disclosure relate to communicating between a terminal and a wireless network node.

BACKGROUND

A wireless network comprises a plurality of network nodes including terminal nodes and access nodes.

The terminal nodes and access nodes communicate with each other wirelessly.

In some circumstances it may be desirable to reduce power consumption at the terminal nodes.

BRIEF SUMMARY

According to various, but not necessarily all, embodiments there is provided a method of communicating between a terminal and a wireless network node comprising, at the terminal:
  checking validity of a timing advance; and
  if the timing advance is valid, causing sending of an uplink connection request within a preconfigured uplink resource.

In some but not necessarily all examples, the method comprises: receiving broadcast network allocation of preconfigured uplink resources for transmission of an uplink connection request.

In some but not necessarily all examples, the preconfigured uplink resources for transmission of an uplink connection request are configured in the same timing and periodicity as RACH resources used for sending a Random Access Preamble.

In some but not necessarily all examples, the method comprises: selecting one of the preconfigured uplink resources and using the selected preconfigured uplink resource to send the uplink connection request.

In some but not necessarily all examples, the method comprises: listening to the common search space configured for Random Access Response to receive a downlink response, in response to the uplink connection request.

In some but not necessarily all examples, the downlink response contains a downlink grant for sending a downlink message and also an uplink grant for an acknowledgement.

In some but not necessarily all examples, the downlink response is combined in a Random Access Response along with a response for the Random Access Preamble, where the downlink response is differentiated with its own identifier.

In some but not necessarily all examples, downlink control information sent on the common search space indicates a separate resource for sending a downlink response.

In some but not necessarily all examples, an apparatus comprises means for performing one or more of the methods.

According to various, but not necessarily all, embodiments there is provided an apparatus comprising:
  at least one processor; and
  at least one memory including computer program code
  the at least one memory and the computer program code configured to, with the at least one processor, cause the apparatus at least to perform:
  checking validity of a timing advance;
  if the timing advance is valid, causing sending of an uplink connection request within a preconfigured uplink resource.

In some but not necessarily all examples, the apparatus is configured as mobile equipment or configured as user equipment.

According to various, but not necessarily all, embodiments there is provided a computer program that, when run on a computer, performs:
  causing a validity check for a timing advance;
  if the timing advance is valid, causing sending of an uplink connection request within a preconfigured uplink resource.

According to various, but not necessarily all, embodiments there is provided a method of communicating between a terminal and a wireless network node comprising, at the wireless network node:
  causing preconfiguring of uplink resources by sending broadcast system information defining multiple preconfigured uplink resources; and
  in response, to receiving an uplink connection request within a preconfigured uplink resource, causing sending of a downlink response to the uplink connection request, wherein the preconfigured uplink resource has a fixed schedule that is time aligned with a schedule for receiving a Random Access Preamble in a Random Access procedure, and
  wherein the downlink response to the uplink connection request and any downlink response to the Random Access Preamble occupy a common resource space.

In some but not necessarily all examples, an apparatus, for example an eNB, comprises means for performing or means for causing performance of the method.

According to various, but not necessarily all, embodiments there is provided an apparatus comprising:
  at least one processor; and
  at least one memory including computer program code
  the at least one memory and the computer program code configured to, with the at least one processor, cause the apparatus at least to perform: causing preconfiguring of uplink resources by sending broadcast system information defining multiple preconfigured uplink resources; and
  in response, to receiving an uplink connection request within a preconfigured uplink resource, causing sending of a downlink response to the uplink connection request,
  wherein the preconfigured uplink resource has a fixed schedule that is time aligned with a schedule for receiving a Random Access Preamble in a Random Access procedure, and
  wherein the downlink response to the uplink connection request and any downlink response to the Random Access Preamble occupy a common resource space.

In some but not necessarily all examples, the apparatus is configured as a base station or part of a base station.

According to various, but not necessarily all, embodiments there is provided a computer program that, when run on a computer, performs:

causing preconfiguring of uplink resources by sending broadcast system information defining multiple preconfigured uplink resources;
and
in response, to receiving an uplink connection request within a preconfigured uplink resource, causing sending of a downlink response to the uplink connection request, wherein the preconfigured uplink resource has a fixed schedule that is time aligned with a schedule for receiving a Random Access Preamble in a Random Access procedure, and
wherein the downlink response to the uplink connection request and any downlink response to the Random Access Preamble occupy a common resource space.

According to various, but not necessarily all, embodiments there is provided a method comprising causing preconfiguring of multiple uplink resources by sending broadcast system information defining the multiple preconfigured uplink resources, wherein the multiple preconfigured uplink resources have a common fixed schedule that is time aligned with a schedule for sending uplink initiation messages of a random access procedure, wherein the multiple preconfigured uplink resources have allocations of frequency different to the frequency used for sending an uplink initiation messages of a random access procedure; and
wherein the multiple available preconfigured uplink resources have a size corresponding to the uplink connection request of the random access procedure; and receiving an uplink connection request of a random access procedure within a preconfigured uplink resource; and
providing a downlink response to the uplink connection request using a resource space shared with downlink responses to uplink initiation messages during a random access procedure.

According to various, but not necessarily all, embodiments there is provided a broadcast information element for preconfiguring multiple uplink resources comprising one or more data structures configured to:

define multiple preconfigured uplink resources that have:
  a common fixed schedule that is time aligned with a schedule for sending uplink initiation messages of a random access procedure;
  allocations of frequency different to the frequency used for sending an uplink initiation messages of a random access procedure; and
  a size corresponding to the uplink connection request of the random access procedure.

According to various, but not necessarily all, embodiments there is provided a method of communicating between a terminal and a wireless network node, comprising, at the terminal:

receiving configuration on a preconfigured uplink access (PUA) region, wherein the PUA region comprises multiple PUA resources;
selecting one PUA resource from the configured PUA region; and
sending a RRC connection request over the selected PUA resource.

According to various, but not necessarily all, embodiments there is provided examples as claimed in the appended claims.

BRIEF DESCRIPTION

Some example embodiments will now be described with reference to the accompanying drawings in which.

DETAILED DESCRIPTION

Figure 1:
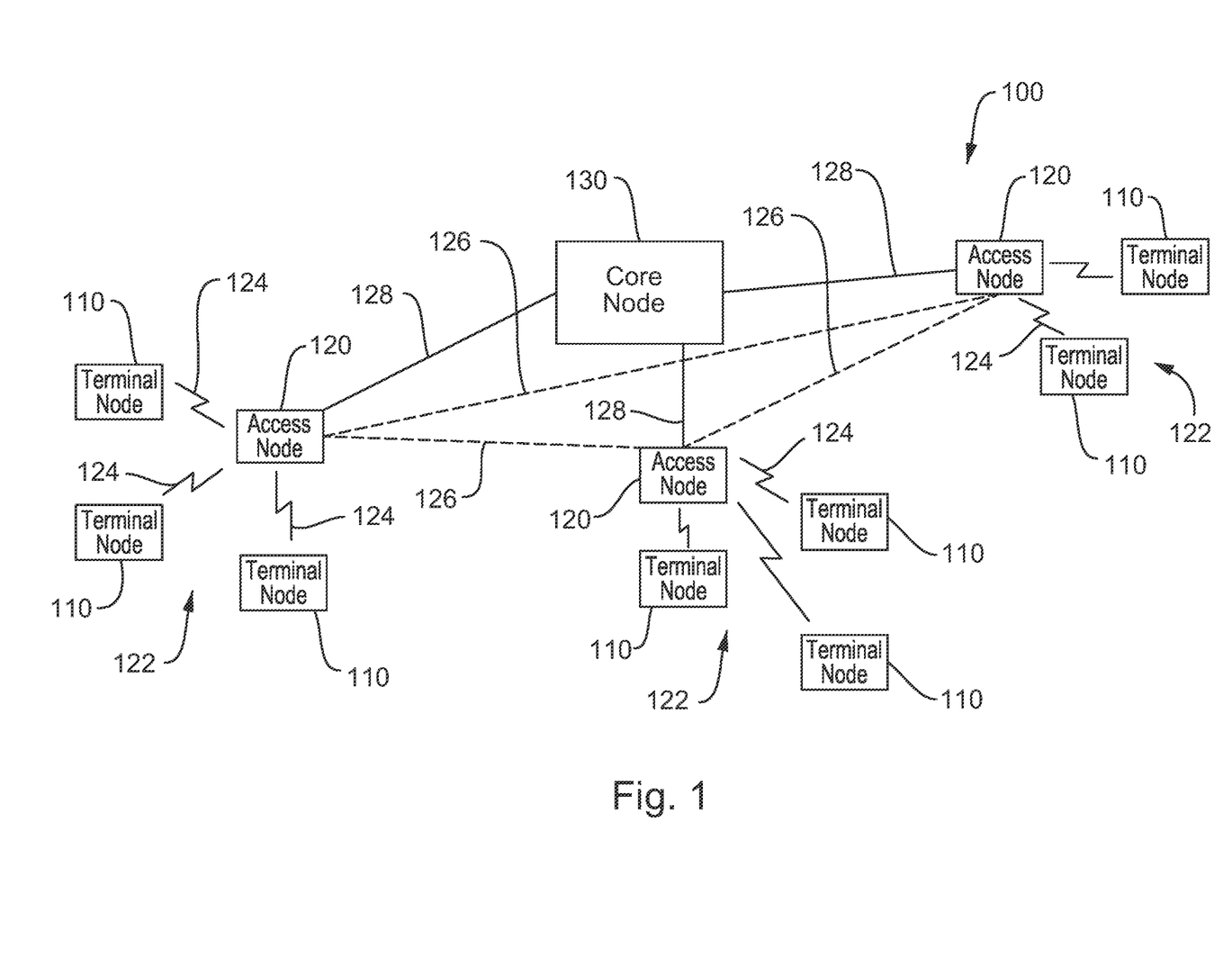
FIG. 1 shows an example embodiment of the subject matter described herein.

FIG. 1 illustrates an example of a network 100 comprising a plurality of network nodes including terminal nodes 110, access nodes 120 and one or more core nodes 130. The terminal nodes 110 and access nodes 120 communicate with each other. The one or more core nodes 130 communicate with the access nodes 120.

The one or more core nodes 130 may, in some examples, communicate with each other. The one or more access nodes 120 may, in some examples, communicate with each other.

The network 100 may be a cellular network comprising a plurality of cells 122 each served by an access node 120. In this example, the interface between the terminal nodes 110 and an access node 120 defining a cell 122 is a wireless interface 124.

The access node 120 is a cellular radio transceiver. The terminal nodes 110 are cellular radio transceivers.

In the example illustrated the cellular network 100 is a third generation Partnership Project (3GPP) network in which the terminal nodes 110 are user equipment (UE) and the access nodes 120 are base stations.

In the particular example illustrated the network 100 is an Evolved Universal Terrestrial Radio Access network (E-UTRAN). The E-UTRAN consists of E-UTRAN NodeBs (eNBs) 120, providing the E-UTRA user plane and control plane (RRC) protocol terminations towards the UE 110. The eNBs 120 are interconnected with each other by means of an X2 interface 126. The eNBs are also connected by means of the S1 interface 128 to the Mobility Management Entity (MME) 130.

Current development of E-UTRAN is focused on supporting large numbers of latency tolerant, low data UEs 110. This enables the machine type communications (MTC) and cellular Internet of Things (IoT). MTC & IoT devices may transmit data only sporadically and the network needs to support sporadic data transmission by a UE 110 when it is in the idle mode 130.

A UE 110 may transmit to network 130 to enable the network to classify the UE 110 for latency requirements, data bandwidth requirements and mobility requirements. For example, a Physical Layer Enhancements for Machine Type Communications (eMTC) protocol may use a reduced bandwidth of 1.4 MHz. For example, a narrowband internet of things (NB-IoT) protocol uses a reduced bandwidth of 200 kHz. The expected mobility of a UE 110 performing the NB-IoT protocol is very low. For NB-IoT protocol there is no handover in the connected state 132.

UEs 110 can be operating at different coverage enhancement levels. This means, that in the same cell 122, different UEs 110 may be using the same logical channels but the characteristics (narrowband resources, repetitions, etc) of the corresponding physical channels can be very different between UEs 110 operating at different coverage enhancement levels.

Figure 2:
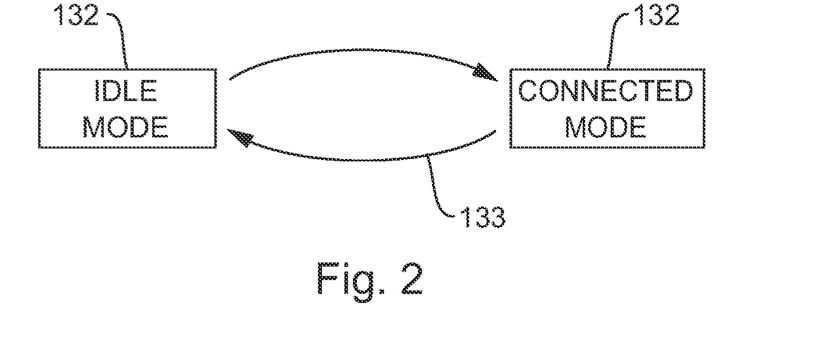
FIG. 2 shows another example embodiment of the subject matter described herein.

FIG. 2 illustrates an example of different modes 130, 132 of a UE 110 and transitions 131, 133 between the modes 130, 132.

The connected mode 132 is a mode that enables communication between the UE 110 and the network 100 at higher layers, for example to enable the communication of application data or higher layer signaling.

The Random Access procedure is used to transition 131 from the idle mode 130 to the connected mode. A transition 133 from the connected mode 132 to the idle mode 130 may, for example, occur on release of the connection or radio link failure.

In the E-UTRAN network 100, the idle mode 130 corresponds to RRC_IDLE and the connected mode corresponds to RRC_CONNECTED. The transition 131 corresponds to RRC Connection Establishment, RRC Connection Re-establishment or Early Data Transmission (EDT). The transition 133 corresponds to RRC Connection RELEASE (also Radio Link Failure).

In the following a terminal node 110 will be referred to as a terminal 110.

A terminal 110 is a device that terminates the cell side of the radio link. It is a device allowing access to network services. The terminal 110 may be a mobile terminal. the terminal may be user equipment or mobile equipment. User equipment is mobile equipment plus a subscriber identity module (SIM).

A base station 120 is a network element in radio access network responsible for radio transmission and reception in one or more cells to or from terminals 110. The base station 120 is the network termination of the radio link. The base station operates as a NodeB.

Figure 3:
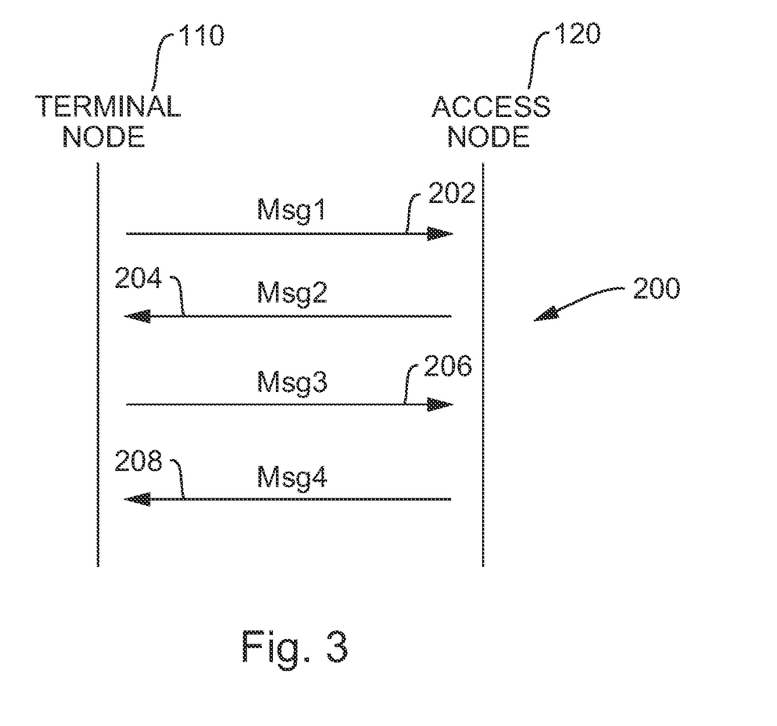
FIG. 3 shows another example embodiment of the subject matter described herein.

FIG. 3 illustrates an example of a contention based random access procedure 200. An example of a contention based random access procedure is described at section 10.1.5 of 3GPP TS 36.300 (2018, Rel 15).

The contention based random access procedure is a common procedure for FDD and TDD. The contention based random access procedure can for example be used for initial access from RRC_IDLE. This may be performed for RRC Connection Establishment, RRC Connection Re-establishment or Early data Transmission (EDT) or other reasons.

The contention based random access procedure 200 starts when the terminal node 110 sends to the access node 120 an uplink initiation message (Msg1) 202. This is the Random Access Preamble in 3GPP TS 36.300 (2018, Rel 15). It is sent in the logical Random Access Channel (RACH) and, physically, in the Physical Random Access Channel (PRACH). The terminal node 110 selects a preamble based on testing at the terminal node 110 of conditions broadcast on system information.

Next, the access node 120 responds to receiving an uplink initiation message (Msg1) 202 by sending a downlink response (Msg2) 204 from the access node 120 to the terminal node 110. The downlink response 204 includes an initial uplink grant. The downlink response 204 is the Random Access Response in 3GPP TS 36.300 (2018, Rel 15). The Random Access Response additionally includes timing alignment information used to determine timing advance. It is addressed to RA-RNTI on PDCCH. The Random Access RNTI (RA-RNTI) unambiguously identifies which time-frequency resource was utilized by the terminal node 110 to transmit the Random Access Preamble 202.

The terminal node 110 uses the timing advance to advance/delay its timings of transmissions to the access node 120 so as to compensate for propagation delay between the terminal node 110 and the access node 120.

Next, the terminal node 110 responds to receiving the downlink response (Msg2) 204 from the access node 120 by sending an uplink connection request (Msg3) 206 from the terminal node 110 to the access node 120. The uplink connection request 206 can comprise an identifier of the terminal node 110. The uplink connection request 206 is the Scheduled Transmission in 3GPP TS 36.300 (2018, Rel 15). The identifier of the terminal node 110 is the UE identifier. The Scheduled Transmission 206 is sent according to the initial uplink grant provided in the Random Access Response 204. The Scheduled Transmission can include a RRC Connection Request, a RRC Connection Re-establishment Request or, if early data transmission (EDT) is enabled a RRC EarlyDataRequest.

Next, the access node 120 responds to receiving the uplink connection request 206 by sending a downlink response (Msg4) 208 from the access node 120 to the terminal node 110. The downlink response 208 to uplink connection request includes identifier of the terminal node 110 received in the uplink connection request 206. The downlink response 208 to uplink connection request is the Contention Resolution in 3GPP TS 36.300 (2018, Rel 15).

In 3GPP Rel-15, e.g. 3GPP TS 36.300 s7.3, sending of small data during the Random Access Procedure 200 without establishing the RRC connection is introduced. This feature is known as early data transmission (EDT). The data transmission happens in the early steps of the Random Access procedure 200. If the terminal node 110 wants to send a data packet (up to 1000 bits) then it sends a special uplink initiation message 202 (a special Random Access Preamble). When the access node 120 detects this special uplink initiation message 202, it knows that the terminal node 110 requests small data transmission. The access node 120 sends downlink response 204

(the Random Access Response) with an uplink grant for an uplink connection request 206 (Scheduled Transmission) with a bigger size of up to 1000 bits. The terminal node 110 sends the data directly in the uplink connection request 206 (Scheduled Transmission). On reception of a downlink response 208 to uplink connection request (Contention Resolution) acknowledging the reception of the data, the terminal node 110 returns to idle (RRC_IDLE) 130.

In 3GPP TS 36.300 (2018, Rel 15), if the Random Access procedure 200 fails after transmission of the Scheduled Transmission 206 e.g. due to contention resolution failure, the terminal node (UE) 110 needs to restart the Random Access Procedure starting from the Random Access Preamble 202 transmission.

In 3GPP TS 36.300 (2018, Rel 15), if a RRC connection needs to be setup, even within a short time interval from release of the last RRC connection, the terminal node 110 needs to restart the Random Access Procedure starting from the Random Access Preamble 202 transmission.

In 3GPP TS 36.300 (2018, Rel 15), if during EDT the Contention Resolution 208, acknowledging data receipt by the access node 120, fails then the terminal node 110 needs to restart the Random Access Procedure starting from the Random Access Preamble 202 transmission.

In case of deep coverage for NB-IoT/eMTC UE 110, NPDCCH/MPDCCH/PDSCH/PUSCH transmission would usually require a large number of repetitions, therefore restarting RA procedure 200 may not always be optimal as this would cause more UE power consumption and control-plane latency.

Preconfigured Uplink Resources.

The procedure is improved by using common preconfigured uplink resources. This use of the common preconfigured uplink resources obviates the need to perform the Random Access procedure from the start (transmitting the uplink initiation message 202), instead it can be performed from the uplink connection request 206. The uplink connection request 206 is sent within a preconfigured uplink resource. The preconfigured uplink resource is different to the initial uplink grant normally used to send the uplink connection request (as described above).

The preconfigured uplink resources (PUR) are preconfigured by the access node 120. The access node 120 allocates a set of uplink resources for uplink transmission. The preconfigured uplink resources are fixed and pre-allocated by the network. They have a fixed location in time. They have a fixed duration in time. They have a fixed frequency. The preconfigured uplink resources may be defined by uplink subframes and frequency resources.

The multiple available preconfigured uplink resources have distinct allocations of the same bandwidth (frequency) with a common timing schedule.

The preconfigured uplink resources can be allocated to each UE individually as dedicated resources. This is called dedicated PUR. The preconfigured uplink resources can be allocated commonly for multiple terminals 110. In this case it is called shared PUR or common PUR. In this case the resources are shared across multiple users.

The access to the preconfigured uplink resources can be contention based or contention free.

The configuration information is sent via broadcast (system information) signaling to all terminals 110. The preconfigured uplink resources are configured for transmission of small data without connection establishment. The terminal 110 using these resources for transmission does not have a RRC connection and any dedicated identifiers. Any terminal 110 in idle mode can use the preconfigured uplink resources if the resource configurations are known.

Figure 4A:
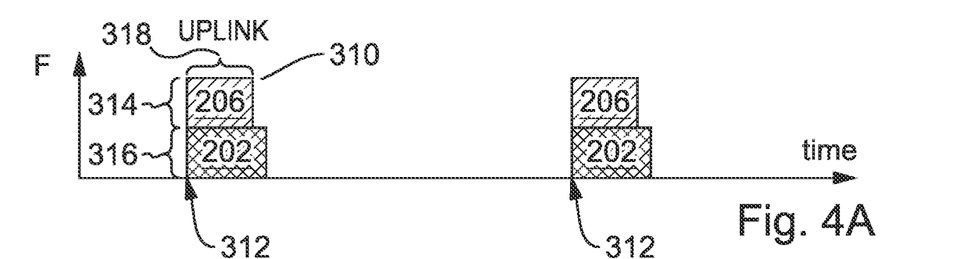
FIG. 4A shows another example embodiment of the subject matter described herein.

FIG. 4A illustrates multiple preconfigured uplink resources 310 that have a common fixed time schedule 312 that is time aligned with a schedule for sending uplink initiation messages 202 of a random access procedure 200. Thus the preconfigured uplink resources 310 for transmission of an uplink connection request are configured in the same timing and periodicity as RACH Resources used for sending a Random Access Preamble. The set of multiple preconfigured uplink resources 310 are allocated to a frequency range 314 different to the frequency range 316 used for sending uplink initiation messages 202 of a random access procedure 200.

The set of multiple preconfigured uplink resources 310, the PUA region, is frequency divided to provide each separate preconfigured uplink resource 310. Each preconfigured uplink resource 310 in the set of multiple preconfigured uplink resources 310 has the same size 318 (e.g. transport block size) corresponding to the uplink connection request 204 of the random access procedure 200. The size may be 88 bits.

Thus multiple preconfigured uplink resources 310 are configured at the same starting time 312 of the PRACH window for sending uplink initiation messages 202 but are separated in frequency from the uplink initiation messages 202.

During a pre-configuration stage, the access node 120 preconfigures the uplink resources by sending broadcast system information defining the preconfigured uplink resources 310. This system information, received at the mobile node 110, is a broadcast network allocation of preconfigured uplink resources for transmission of an uplink connection request. This broadcast system information can be sent as a broadcast information element for preconfiguring multiple uplink resources. The broadcast information element comprises one or more data structures, for example fields, configured to define multiple preconfigured uplink resources 310 that have:

a common fixed time schedule 312 that is time aligned with a schedule for sending uplink initiation messages 202 of a random access procedure 200;

allocations of frequency 314 different to the frequency 316 used for sending uplink initiation messages 202 of a random access procedure 200; and a size 318 corresponding to the uplink connection request 204 of the random access procedure 200.

UE Operation

Figure 5:
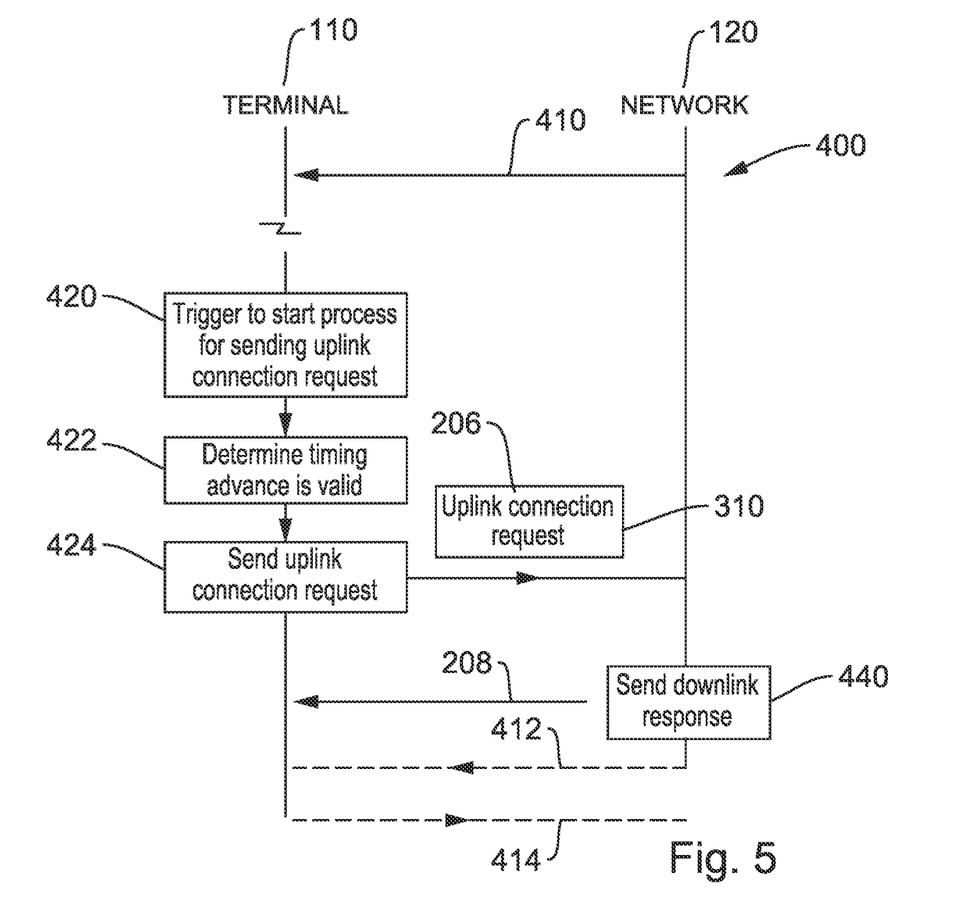
FIG. 5 shows another example embodiment of the subject matter described herein.

Referring to a method 400 illustrated in FIG. 5, instead of re-starting the random access procedure 200 and sending uplink initiation message 202 and downlink response 204 in the normal way, the terminal 110 sends, at block 424, the uplink connection request 206 via a preconfigured uplink access resource 310.

The timing advance will need to be valid. In at least some examples, the terminal 110 is configured to check validity of a timing advance before causing the sending of the uplink connection request 206 within the preconfigured uplink resource 310. The timing advance becomes invalid if a validity timer expires in idle state. Other criteria can be used to invalidate the timing advance, for example, changes in received signal strength measurement, changes in serving cell id, movement of the terminal 110 beyond a threshold distance (e.g. 500 m).

If the timing advance is determined to be valid, at block 422, the terminal 120 sends, at block 424, an uplink connection request 206 within a preconfigured uplink resource 310.

The uplink connection request 206 can, in at least some examples, comprise an identifier of the terminal 110.

The preconfigured uplink resource 310 used to send the uplink connection request 206 can, in at least some examples, be different to the initial uplink grant 316 provided previously by a downlink response 204 of a random access procedure 200. The preconfigured uplink resource 310 used for sending the uplink connection request 206 is not scheduled by the downlink response 204 (although scheduling will depend upon a timing advance supplied). The preconfigured uplink resource 310 has a fixed, pre-allocated timing schedule that is independent of the uplink grant and is time aligned with a time schedule for sending uplink initiation messages 202. One of preconfigured uplink resources 310 is selected and the selected preconfigured uplink resource 310 is used to send the uplink connection request 206. The preconfigured uplink resource 310 can be randomly selected by the terminal 110 from the set of multiple available preconfigured uplink resources 310.

At block 420, a trigger causes the terminal to start the process for sending an uplink connection request 206 within a preconfigured uplink resource 310. The terminal can, for example, send an uplink connection request 206 within a preconfigured uplink resource 310 in the following scenarios:

(i) to enable a random access procedure 200 without sending an uplink initiation message 202 and without receiving a downlink response 204 comprising an initial uplink grant. The uplink connection request 204 can be used for connection re-establishment or early data transmission. The connection request 204 can be, for example, RRC_Connection_Re-establishment_Request, or RRC_EarlyDataRequest.

(ii) in response to contention failure during a random access procedure 200, to continue the random access procedure 200 without re-sending an uplink initiation message 202 and without re-receiving a downlink response 204 comprising an initial uplink grant. The uplink connection request 204 can be used for connection establishment, connection re-establishment or early data transmission. The connection request 204 can be, for example, RRC_Connection_Request, RRC_Connection_Re-establishment_Request, or RRC_EarlyDataRequest.

As previously described, in the random access procedure 200, the terminal 110 responds to receipt of a downlink response 204 comprising an initial uplink grant by sending an uplink connection request 206, comprising an identifier of the terminal 110, using the initial uplink grant. After a delay without receiving a downlink contention resolution response 208, if the timing advance remains valid, the terminal 110 sends the uplink connection request 206, comprising the identifier of the terminal 110, within the preconfigured uplink resource 310 which is different to the initial uplink grant.

In response to receiving the uplink connection request 206 within a preconfigured uplink resource 310 the access node 120 sends, at block 440, a downlink response 208. The downlink response 208 is a response to the uplink connection request 206 within the preconfigured uplink resource 310. This continues the random access procedure 200. The uplink connection request 206 may be used for connection establishment, connection re-establishment or early data transmission.

Figure 4B:
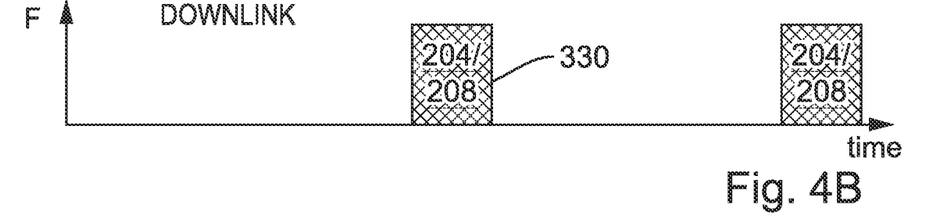
FIG. 4B shows another example embodiment of the subject matter described herein.

As illustrated in FIG. 4B, the downlink response 204 to the uplink initiation message 202 and the downlink response 208 to the uplink connection request 206 within the preconfigured uplink resource 310 can occupy a common resource space 330 monitored by the terminal 110. The monitored common resource space 330 comprises common timing and a common frequency space. The downlink responses 204, 208 are both transmitted in a Physical Downlink Control Channel. Thus the terminal 110 listens to the same common search space 330 configured for Random Access Response 204 to get a downlink response 208, in response to the uplink connection request 206.

A one-step process may be used for delivery of the downlink contention resolution response. In this case, the downlink response 208 to the uplink connection request 206 within the preconfigured uplink resource provides a downlink contention resolution response, for example, comprising the received identifier of the terminal.

Alternatively a multi-step process may be used for delivery of the downlink contention resolution response. In this case, the downlink response 208 to the uplink connection request 206 within the preconfigured uplink resource 310 allocates directly or indirectly a future resource 412 for providing a downlink contention resolution response comprising the received identifier of the terminal.

In one example, the downlink response 208 to the uplink connection request 206 within the preconfigured uplink resource 310 provides a time schedule to receive a downlink contention resolution response comprising the received identifier of the terminal. For example, the downlink response 208 to the uplink connection request 206 within the preconfigured uplink resource can provide a downlink response 204 to the uplink initiation message defining a time schedule for receiving a downlink contention resolution response comprising the received identifier of the terminal. At the scheduled time, the mobile node 110 receives a downlink contention resolution response comprising the received identifier of the terminal.

In the following examples the common search space (RNTI) 330 configured for Random Access Response is used for enabling receipt, directly 208 or indirectly 412, the downlink contention response.

Downlink control information (DCI) sent to the terminal 110 via the common search space 330 schedules two separate transport blocks. A first one is allocated for the downlink Random Access Response 202 and the second is used for the downlink response 208. The downlink response 208 contains a downlink grant for sending 412 the downlink contention response. Thus the downlink control information sent on the common search space 330 indicates a separate resource for sending a downlink response 208. The downlink response 208 can be the downlink contention response or can be used to schedule the downlink contention response.

Where the common search space 330, corresponds to the search space used for the Random Access Response (RA-RNTI), a downlink response message 204 is modified to include information elements as the downlink response 208 in addition to the Random Access Response. In one example, the information elements (downlink response 208) include a downlink grant to send a downlink message 412 and an uplink grant for an acknowledgement 414 in reply. The information element also includes an identifier to identify the predetermined uplink resource 310 used to send the uplink connection request 206. The downlink message 412 can be the downlink contention response or can be used to schedule the downlink contention response. In another example, the information elements (downlink response 208) includes the downlink contention response.

Figure 6A:
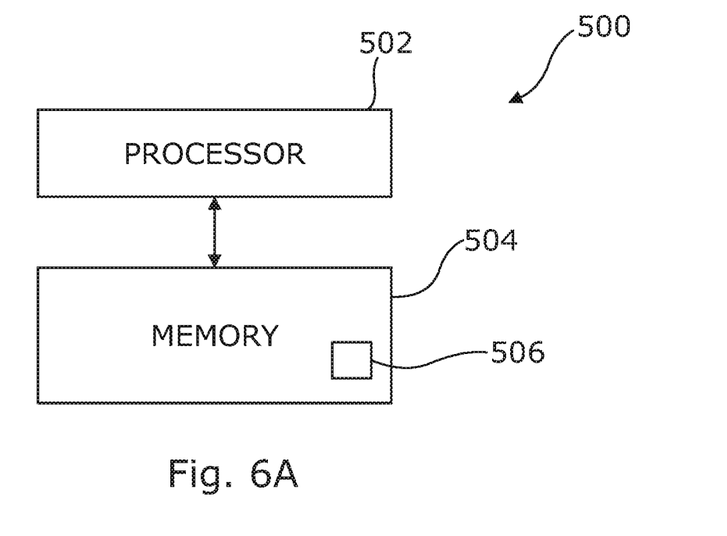
FIG. 6A shows another example embodiment of the subject matter described herein.

FIG. 6A illustrates an example of a controller 500. Implementation of a controller 500 may be as controller circuitry. The controller 500 may be implemented in hardware alone, have certain aspects in software including firmware alone or can be a combination of hardware and software (including firmware).

As illustrated in FIG. 6A the controller 500 may be implemented using instructions that enable hardware functionality, for example, by using executable instructions of a computer program 506 in a general-purpose or special-purpose processor 502 that may be stored on a computer readable storage medium (disk, memory etc) to be executed by such a processor 502.

The processor 502 is configured to read from and write to the memory 504. The processor 502 may also comprise an output interface via which data and/or commands are output by the processor 502 and an input interface via which data and/or commands are input to the processor 502.

The memory 504 stores a computer program 506 comprising computer program instructions (computer program code) that controls the operation of the apparatus 110, 120 when loaded into the processor 502. The computer program instructions, of the computer program 506, provide the logic and routines that enables the apparatus to perform the methods illustrated in FIG. 5. The processor 502 by reading the memory 504 is able to load and execute the computer program 506.

The apparatus 110 therefore comprises:
at least one processor 502; and
at least one memory 504 including computer program code
the at least one memory 504 and the computer program code configured to, with the at least one processor 502, cause the apparatus 110 at least to perform: checking validity of a timing advance;
if the timing advance is valid, causing sending of an uplink connection request within a preconfigured uplink resource.

The apparatus 120 therefore comprises:
at least one processor 502; and
at least one memory 504 including computer program code
the at least one memory 504 and the computer program code configured to, with the at least one processor 502, cause the apparatus 110 at least to perform:
causing preconfiguring of uplink resources by sending broadcast system information defining multiple preconfigured uplink resources;
and
in response, to receiving an uplink connection request within a preconfigured uplink resource, causing sending of a downlink response to the uplink connection request, wherein the preconfigured uplink resource has a fixed schedule that is time aligned with a schedule for receiving a Random Access Preamble in a Random Access procedure, and
wherein the downlink response to the uplink connection request and any downlink response to the Random Access Preamble occupy a common resource space.

Figure 6B:
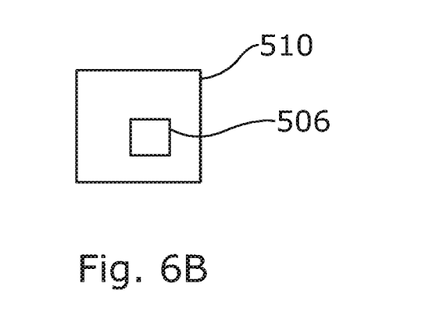
FIG. 6B shows another example embodiment of the subject matter described herein.

As illustrated in FIG. 6B, the computer program 506 may arrive at the apparatus 110, 120 via any suitable delivery mechanism 510. The delivery mechanism 510 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 506. The delivery mechanism may be a signal configured to reliably transfer the computer program 506. The apparatus 110, 120 may propagate or transmit the computer program 506 as a computer data signal.

Computer program instructions for causing an apparatus 110 to perform at least the following or for performing at least the following:
checking validity of a timing advance;
if the timing advance is valid, causing sending of an uplink connection request within a preconfigured uplink resource.

Different computer program instructions for causing an apparatus 120 to perform at least the following or for performing at least the following:
causing preconfiguring of uplink resources by sending broadcast system information defining multiple preconfigured uplink resources;
and
in response, to receiving an uplink connection request within a preconfigured uplink resource, causing sending of a downlink response to the uplink connection request, wherein the preconfigured uplink resource has a fixed schedule that is time aligned with a schedule for receiving a Random Access Preamble in a Random Access procedure, and
wherein the downlink response to the uplink connection request and any downlink response to the Random Access Preamble occupy a common resource space.

The computer program instructions may be comprised in a computer program, a non-transitory computer readable medium, a computer program product, a machine readable medium. In some but not necessarily all examples, the computer program instructions may be distributed over more than one computer program.

Although the memory 504 is illustrated as a single component/circuitry it may be implemented as one or more separate components/circuitry some or all of which may be integrated/removable and/or may provide permanent/semi-permanent/dynamic/cached storage.

Although the processor 502 is illustrated as a single component/circuitry it may be implemented as one or more separate components/circuitry some or all of which may be integrated/removable. The processor 502 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIG. 5 may represent steps in a method and/or sections of code in the computer program 506. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

In some but not necessarily all examples, the apparatus 110 is configured to communicate data from the apparatus 110 with or without local storage of the data in a memory 504 at the apparatus 110 and with or without local processing of the data by circuitry or processors at the apparatus 110.

The data may be stored in processed or unprocessed format remotely at one or more devices. The data may be stored in the Cloud.

The data may be processed remotely at one or more devices. The data may be partially processed locally and partially processed remotely at one or more devices.

The data may be communicated to the remote devices wirelessly via short range radio communications such as Wi-Fi or Bluetooth, for example, or over long range cellular radio links. The apparatus may comprise a communications interface such as, for example, a radio transceiver for communication of data.

The apparatus 110 may be part of the Internet of Things forming part of a larger, distributed network.

The processing of the data, whether local or remote, may be for the purpose of health monitoring, data aggregation, patient monitoring, vital signs monitoring or other purposes.

The processing of the data, whether local or remote, may involve artificial intelligence or machine learning algorithms. The data may, for example, be used as learning input to train a machine learning network or may be used as a query input to a machine learning network, which provides a response. The machine learning network may for example use linear regression, logistic regression, vector support machines or an acyclic machine learning network such as a single or multi hidden layer neural network.

The processing of the data, whether local or remote, may produce an output. The output may be communicated to the apparatus 110 where it may produce an output sensible to the subject such as an audio output, visual output or haptic output.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

What is claimed is:

1. A method of communicating between a terminal and a wireless network node comprising, at the terminal:
receiving, from the wireless network node, a first downlink response to an uplink initiation message;
checking validity of a timing advance;
if the timing advance is valid, sending, to the wireless network node, an uplink connection request within a preconfigured uplink resource; and
receiving, from the wireless network node, a second downlink response to the uplink connection request,
wherein the first downlink response and the second downlink response occupy a common resource space.

2. The method as claimed in claim 1 further comprising: receiving dedicated preconfigured uplink resources for transmission of the uplink connection request.

3. The method as claimed in claim 2, wherein the preconfigured uplink resources for transmission of the uplink connection request are configured in the same timing and periodicity as RACH resources used for sending a Random Access Preamble.

4. The method as claimed in claim 2 further comprising: selecting one of the preconfigured uplink resources and using the selected preconfigured uplink resource to send the uplink connection request.

5. The method as claimed in claim 1, wherein at least one of the first downlink response and the second downlink response is addressed to an identifier of the terminal.

6. The method as claimed in claim 1, wherein the second downlink response contains a downlink grant for receiving a downlink message and an uplink grant for an acknowledgement.

7. The method as claimed in claim 1, wherein the second downlink response is combined in a Random Access Response along with a response for a Random Access Preamble, where the second downlink response is differentiated with its own identifier.

8. An apparatus comprising:
at least one processor; and
at least one memory including computer program code
wherein the at least one memory and the computer program code are configured to, with the at least one processor, cause the apparatus at least to:
receive, from the wireless network node, a first downlink response to an uplink initiation message;
check validity of a timing advance;
if the timing advance is valid, send, to the wireless network node, an uplink connection request within a preconfigured uplink resource; and
receive, from the wireless network node, a second downlink response to the uplink connection request,
wherein the first downlink response and the second downlink response occupy a common resource space.

9. The apparatus as claimed in claim 8, the at least one memory and the computer program code configured to, with the at least one processor, cause the apparatus further to: receive dedicated preconfigured uplink resources for transmission of the uplink connection request.

10. The apparatus as claimed in claim 9, wherein the preconfigured uplink resources for transmission of the uplink connection request are configured in the same timing and periodicity as RACH resources used for sending a Random Access Preamble.

11. The apparatus as claimed in claim 9, the at least one memory and the computer program code configured to, with the at least one processor, cause the apparatus further to:
select one of the preconfigured uplink resources and using the selected preconfigured uplink resource to send the uplink connection request.

12. The apparatus as claimed in claim 8, wherein at least one of the first downlink response and the second downlink response is addressed to an identifier of the apparatus.

13. The apparatus as claimed in claim 8, wherein the second downlink response contains a downlink grant for receiving a downlink message and an uplink grant for an acknowledgement.

14. The apparatus as claimed in claim 8, wherein the second downlink response is combined in a Random Access Response along with a response for a Random Access Preamble, where the second downlink response is differentiated with its own identifier.

15. The apparatus as claimed in claim 8, wherein downlink control information received on a common search space indicates a separate resource for receiving the second downlink response.

16. The apparatus as claimed in claim 8, wherein the apparatus configured as mobile equipment or configured as user equipment.

17. An apparatus comprising:
at least one processor; and
at least one memory including computer program code;
the at least one memory and the computer program code configured to, with the at least one processor, cause the apparatus at least to:
preconfigure uplink resources by sending information defining multiple preconfigured uplink resources;
transmit, to a terminal, a first downlink response to an uplink initiation message; and
in response to reception of an uplink connection request within a preconfigured uplink resource, sending a second downlink response to the uplink connection request,
wherein at least one of the first downlink response and the second downlink response is addressed to an identifier of a terminal, and
wherein the first downlink response and the second downlink response occupy a common resource space.

18. The apparatus as claimed in claim 17, wherein the information defining multiple preconfigured uplink resources comprises at least one of broadcast system information or dedicated resources.

19. The apparatus as claimed in claim 17, wherein the preconfigured uplink resource has a fixed schedule that is time aligned with a schedule for receiving a Random Access Preamble in a Random Access procedure.

20. The apparatus as claimed in claim 17, wherein the apparatus configured as a base station or part of a base station.

* * * * *